United States Patent [19]

Ishida et al.

[11] 4,284,974
[45] Aug. 18, 1981

[54] FLASHER APPARATUS FOR VEHICLES

[75] Inventors: Hideo Ishida; Yasuhiko Sukurai, both of Kariya, Japan

[73] Assignee: Nippondenso Co., Ltd., Kariya, Japan

[21] Appl. No.: 135,931

[22] Filed: Mar. 31, 1980

[30] Foreign Application Priority Data

Apr. 5, 1979 [JP] Japan .................................. 54-41361

[51] Int. Cl.³ ........................... B60Q 1/38; B60Q 1/26
[52] U.S. Cl. ..................... 340/81 R; 340/73; 340/642
[58] Field of Search ................... 340/81 R, 80, 79, 73, 340/74, 78, 52 R, 635, 641, 72, 642, 650; 307/10 LS; 315/77, 200 A

[56] References Cited

U.S. PATENT DOCUMENTS 3,956,733  5/1976  Sakurai .............................. 340/81 R
4,086,565  4/1978  Schorter ............................ 340/81 R
4,105,996  8/1978  Shimizu ............................. 340/81 R
4,150,359  4/1979  Mizuno et al. ..................... 340/81 R Primary Examiner—John W. Caldwell, Sr.
Assistant Examiner—Donnie L. Crosland
Attorney, Agent, or Firm—Cushman, Darby & Cushman

[57] ABSTRACT

A flasher apparatus for vehicles capable of protecting from a short-circuit failure. A relay switch is connected in series with an electric power source and direction indicating lamps so that the lamps are energized periodically by the closure of the switch activated by the periodic conduction of an output transistor of an oscillator circuit. A short-circuit detector circuit detects an electric current flowing to the lamps and prevents the output transistor from being rendered conductive in response to the large value of the electric current. The output transistor is allowed to be rendered conductive when a rush current flows to the lamps.

1 Claim, 4 Drawing Figures

FLASHER APPARATUS FOR VEHICLES

BACKGROUND OF THE INVENTION

The present invention relates to a flasher apparatus for vehicles capable of protecting from a short-circuit failure.

Most of conventional flasher apparatus for vehicles which have been in actual practice employ, as a safety means relative to an excessively large current caused by the short-circuits in direction indicating lamps and associated electric windings, fusible links provided outside or inside the flasher apparatus and equivalents thereof.

In the conventional apparatus, however, it often occurs that a vehicle operator replaces the burned out fusible link provided outside the apparatus by a new one which has a larger rated value or an alternative. Such a replacement is not desirable from the standpoint of safe running and management of the vehicle. In the case the fusible link or the equivalent is provided inside the apparatus, the flasher apparatus is disabled from its function by the excessively large current. This also results in the undesired result from the standpoint of safe vehicle running.

SUMMARY OF THE INVENTION

It is an object of the present invention to provide a flasher apparatus for vehicles whose abnormal condition is detected with ease and whose burnout is prevented. For this object, when a short-circuit is detected, the flasher apparatus is disabled from its operation, that is, a flasher relay is kept OFF to function as a circuit breaker so that the short-circuit current is prevented from flowing.

DETAILED DESCRIPTION OF THE PREFERRED EMBODIMENTS

Figure 1:
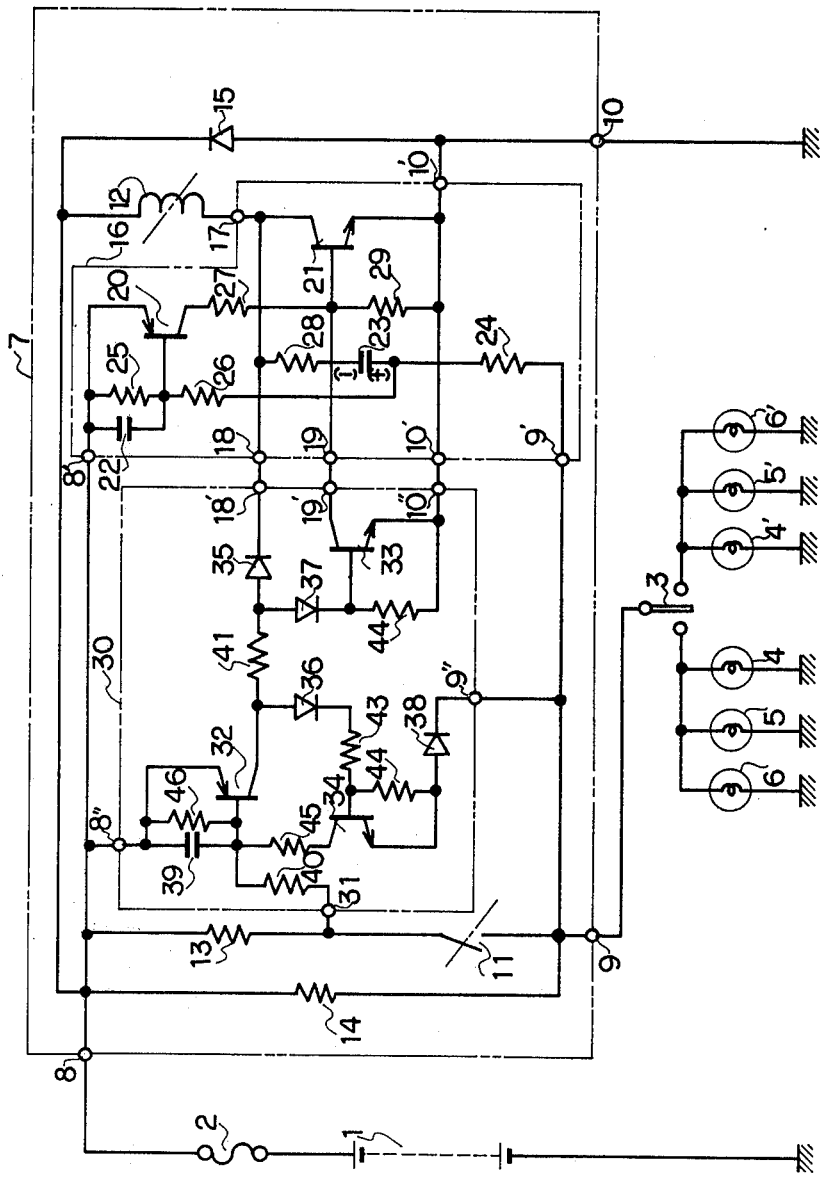
FIG. 1 is an electric wiring diagram illustrating the first embodiment of the flasher apparatus according to the invention.

In FIG. 1 illustrating a first embodiment, numeral 1 designates a source of electric power whose one end is grounded. Numeral 2 designates a fusible link whose one end is connected to the other end of the source of electric power. Numeral 3 designates a direction indicating switch, 4, 4', 5 and 5' direction indicating lamps, and 6 and 6' indicated direction indicating lamps provided on an instrument panel of a vehicle compartment. One ends of the lamps 4, 4', 5, 5', 6 and 6' are grounded, while the other ends thereof are connected to the direction indicating switch 3. Numeral 7 designates a flasher control circuit including a flasher circuit and a short-circuit current prevention circuit which will be described later. Numeral 8 designates a power terminal conntected to the power terminal of the source of electric power 1 through the fusible link 2. Numeral 9 designates a load terminal connected to the lamps 4, 4', 5, 5', 6 and 6' through the direction indicating switch 3. Numeral 10 designates a ground terminal.

Numeral 12 designates a winding of an electromagnetic relay used as flasher switch means, 11 a normally open (OFF) switch actuated by the winding 12, 13 a resistor used as current detecting means which has a small resistance of some 0.05 ohm. Numerals 14 and 15 respectively designate a resistor and a diode used for circuit protection. Numeral 16 designates an oscillator cirucit whose terminals 8', 9' and 10' are respectively connected to the power terminal 8, the load terminal 9 and the ground. Numerals 18 and 19 designate terminals connected to a short-circuit detector circuit 30. Numerals 20, 21 and 23 respectively designate a first transistor, a second transistor functioning as a flasher transistor and a charge-and-discharge capacitor. Numerals 32, 33 and 34 respectively designate a third transistor functioning as a current detecting transistor, a fourth transistor functioning as a flasher stop transistor and a fifth transistor functioning as a self-hold transistor. Numerals 35 to 38 designates reverse current preventing diodes, 39 a noise absorbing capacitor, and 40 to 46 resistors. The oscillator circuit 16 and the short-circuit detector circuit 30 constitutes a control means.

The operation of the flasher apparatus described hereinabove will be described next. Assuming that no short-circuit is present, the first and second transistors 20 and 21 in the oscillator circuit 16 conduct to energize the winding 12 of the relay when the direction indicating switch 3 is turned on to the left in FIG. 1. The contact 11 is responsively closed (ON) to energize the lamps 4, 5 and 6 by the electric current which flows from the source of electric power 1 to the ground through the fusible link 2, the power terminal 8, the resistor 13, the contact 11, the load terminal 9, the direction indicating switch 3 and the lamps 4, 5 and 6. The capacitor 23 in the oscillator circuit 16 repeats charging and discharging to render the first and second transistors 20 and 21 ON and OFF periodically so that the lamps 4, 5 and 6 are energized periodically.

Figure 2:
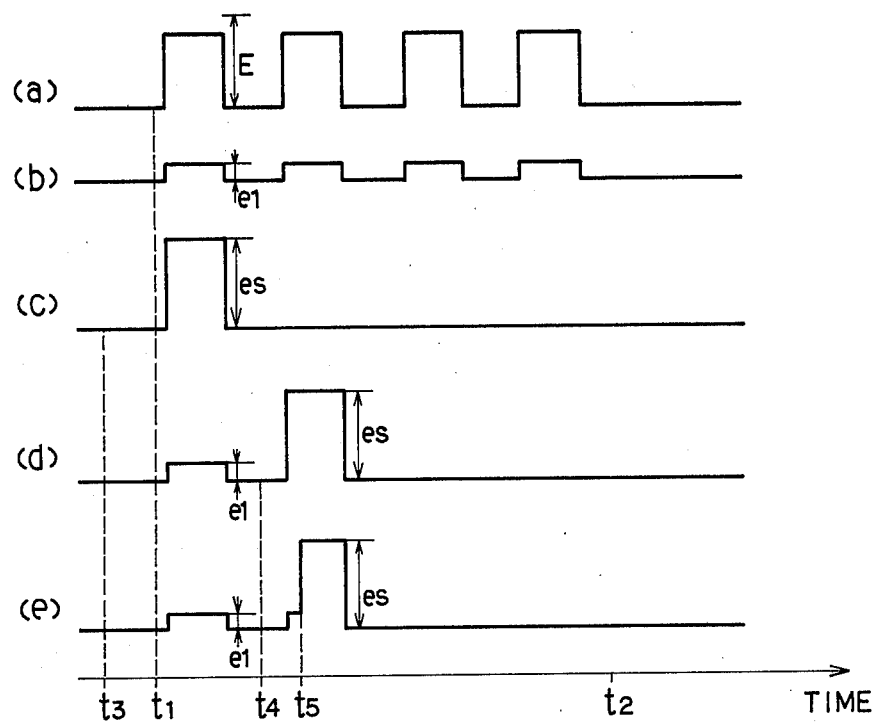
FIG. 2 is a wafeform chart illustrating voltages (a) to (e) developed in the apparatus in FIG. 1, and FIGS. 3 and 4 are electric wiring diagrams respectively illustrating the second and third embodiments of the flasher apparatus according to the invention.

The difference in potentials developed at both ends of the current detecting resistor 13 and the difference in potentials developed at both ends of the lamps 4 and 5 are illustrated in (a) and (b) of FIG. 2, respectively. Although the potential difference across the resistor 13 is proportional to the current flowing therethrough, the third transistor 32 is not supplied with a sufficient base current under the absence of the short-circuit. As a result, the third transistor 32 is kept OFF. The fouth and fifth transistors 33 and 34 are not supplied with the sufficient base current either and are kept OFF. Under this condition, the terminals 18 and 18' between the short-circuit detector circuit 30 and the oscillator circuit 16 develops a voltage equal to that developed between the collector of the second transistor 21 and the ground, while the terminals 19 and 19' develop a voltage equal to that developed between the base of the transistor 21 and the ground.

Assuming next that the short-circuit occurs among the load terminal 9, the direction indicating switch 3, the direction indicating lamps 4, 5 and 6, and the ground, the first and second transistors 20 and 21 in the oscillator circuit are rendered ON to close the contact 11. The potential difference ES across the resistor 13 is increased as illustrated in (c) of FIG. 2 because of the presence of short-circuit, and the third transistor 32 is rendered ON with the sufficient base current supplied thereto. Under the condition that the second transistor 21 is kept ON, the potential at the terminals 18 and 18' is substantially equal to the ground potential and the fourth and fifth transistors 33 and 34 are not supplied with the sufficient base current. As a result, the transistors 33 and 34 are kept OFF. When the first and second transistors 20 and 21 are rendered OFF by the completion of charging operation of the capacitor 23, the potential at the terminals 18 and 18' is increased.

As a result, the fourth and fifth transistors 33 and 34 are supplied with the sufficient base current from the third transistor 32 which is now ON. The contact 11 opens on this occasion. The fifth transistor 34 is rendered ON so that the current flows through the current detecting resistor 13, the terminal 31 and the resistors 40 and 45, since the short-circuit is present between the load terminal 9 and the ground. The current thus flows from the source of electric power 1 through the fusible link 2, the terminal 8, the resistors 40 and 45, the transistor 34 and the diode 38. Since the base current of the third transistor 32 flows through the transistor 34, the transistor 32 is kept ON.

On this occasion, the base current of the fourth transistor 33 flows from the source of electric power 1 through the fusible link 2, the terminals 8 and 8'', the transistor 32, the resistor 41 and the diode 37. Therefore, the transistor 33 is conditioned to enable the current to flow through its collector-emitter path. When the capacitor 23 completes the discharging, the transistor 20 is again rendered ON. The electric current flows to the fourth transistor 33 connected to the terminals 19 and 19'. Since the potential at the terminals 19 and 19' is decreased close to the ground potential, the second transistor 21 supplied with little base current is not able to be rendered ON thus keeping the contact 11 OFF. Thus, when the short-circuit occurs, the short-circuit detector circuit 30 operates such that the contact 11 closes once and thereafter keeps opening.

When the direction indicating switch 3 is opened, the fifth transistor 34 supplied with no base current is rendered OFF. The third transistor 32 is supplied with little base current and responsively rendered OFF. The fourth transistor 33 is also supplied with little base current and conditioned in its reset condition. Provided that the direction indicating switch 3 is closed to the left again under the presence of the short-circuit, the abovedescribed operation is repeated. On the contrary, provided that the switch 3 is closed to the right, the short-circuit detector circuit 30 does not operate and the lamps 4', 5' and 6' periodically flash because of the absence of the short-circuit. Since the relay contact 11 is kept OFF in response to the appearance of the short-circuit current in such a manner as described above, undesired accidents caused by the short-circuit current are effectively prevented. The presence of the short-circuit is recognized with ease from the fact that the direction indicating lamps in which no short-circuit is present periodically flashes as desired.

In the short-circuit detector circuit 30, all the transistors 32, 33 and 34 are kept OFF when the direction indicating switch 3 is kept open. Therefore, the electric current does not flow from the terminal 8'' to the terminals 10'' through the transistor 32 and from the terminal 8' to the terminal 10'. That is, no current flows from the source of electric power 1 to the ground through the flasher control circuit 7. It is therefore advantageous that undesirable discharging of the source of electric power under the inoperativeness of the vehicle is prevented.

The operation of the oscillator circuit 16 is described next. With the voltage of the source of electric power applied to the terminals 8 and 8', the current flows through the resistors 24, 26 and 24 and the transistor 20 supplied with the base current is rendered ON. The transistor 21 is also rendered ON with the base current flowing through the transistor 20 and the resistor 27. The relay winding 12 is energized to close the contact 11. As a result, the terminals 9 and 9' are supplied with the voltage so that the capacitor 23 is charged in the illustrated plus and minus polarities by the current flowing through the resistors 24 and 28 and the transistor 21. The capacitor 23 is charged, at the same time, by the current flowing through the resistors 25, 26 and 28 and the transistor 21.

The transistor 20 is kept ON with the charging current for the capacitor 23 flowing to the resistor 25 even after the closure of the relay contact 11. When the capacitor 23 is charged to a predetermined level, the current flowing through the resistor 25 decreases to decrease the base current of the transistor 20 which is rendered OFF in turn. The transistor 21 is also supplied with no current and rendered OFF. As a result, charging the capacitor 23 is stopped and the relay winding 12 is deenergized to open the contact 11. The electric charge stored on the capacitor 23 is discharged through the resistors 26 and 25, the winding 12 and the resistor 28, and through the resistor 24, terminals 9' and 9, the switch 3, the direction indicating lamps (e.g. lamps 4 and 5), the source of electric power 1, the fusible link 2, the terminal 8, the winding 12 and the resistor 28.

As the discharging proceeds, the discharging current of the capacitor 23 flowing through the resistor 25 gradually decreases. As a result, the current finally starts flowing from the source of electric power 1 through the fusible link 2, the terminals 8 and 8', the resistors 25, 26 and 24, the terminals 9' and 9, the switch 3 and the direction indicating lamps 4 and 5 so that the transistor 20 is rendered ON again. Thus the transistors 20 and 21 are repeatedly rendered ON and OFF. When the base-emitter path of the transistor 21 is short-circuited by the transistor 33, the transistor 21 is disabled from its ON condition. As a result, the contact 11 is disabled from closing and the periodic flashing is stopped. In FIG. 1, it should be noted that numeral 17 designates a terminal, 24, 26, 27, 28 and 29 resistors, 22 a capacitor, and 8'', 9'' and 10'' terminals.

Waveforms of the voltages developed in the circuit illustrated in FIG. 1 is illustrated in FIG. 2. A waveform chart (a) illustrates the voltage developed across the direction indicating lamps 4, 5 and 6 under the absence of the short-circuit. E indicates the voltage of the source of electric power. $t_1$ and $t_2$ indicate the timings the direction indicating switch 3 is closed and opened, respectively. A waveform chart (b) illustrates the difference in potentials developed at the both ends of the current detecting resistor 13, wherein $e_1$ indicates the potential difference under the absence of the short-circuit. Waveform charts (c) to (e) illustrate the difference in potentials $e_s$ developed at the both ends of the current detecting resistor 13, wherein $t_3$ to $t_5$ indicate the timings the short-circuit occurs.

It should be noted in FIG. 1 that the collectors of the transistors 21 and 32 and the bases of the transistors 33 and 34 are interconnected by the resistors 41 and 43 and the diodes 36, 37 and 35. Therefore, even when the excessively large current shch as the rush current which temporarily flows at the beginning of the lamp energization flows through the current detecting resistor 13, the transistors 33 and 34 whose base potentials are kept low by the ON condition of the transistor 21 are not rendered ON. Therefore, it never occurs that the relay contact 11 is erroneously opened in response to the rush current.

As illustrated in (e) of FIG. 2, the contact 11 does not open immediately after the appearance of the short-circuit current in the middle of the closure of the relay contact 11 (that is, the transistor 21 is kept ON.) Instead, the transistors 33 and 34 are rendered ON to prevent the transistor 12 from being again rendered ON, on condition that the transistor 32 is kept ON when the transistor 21 is rendered OFF (The contact 11 is not open but is just prior to opening because of the response delay.). By this operation, prevented is erroneous operation caused by the rush current which flows through the lamp filaments insufficiently heated at the beginning of the lamp energization.

Figure 3:
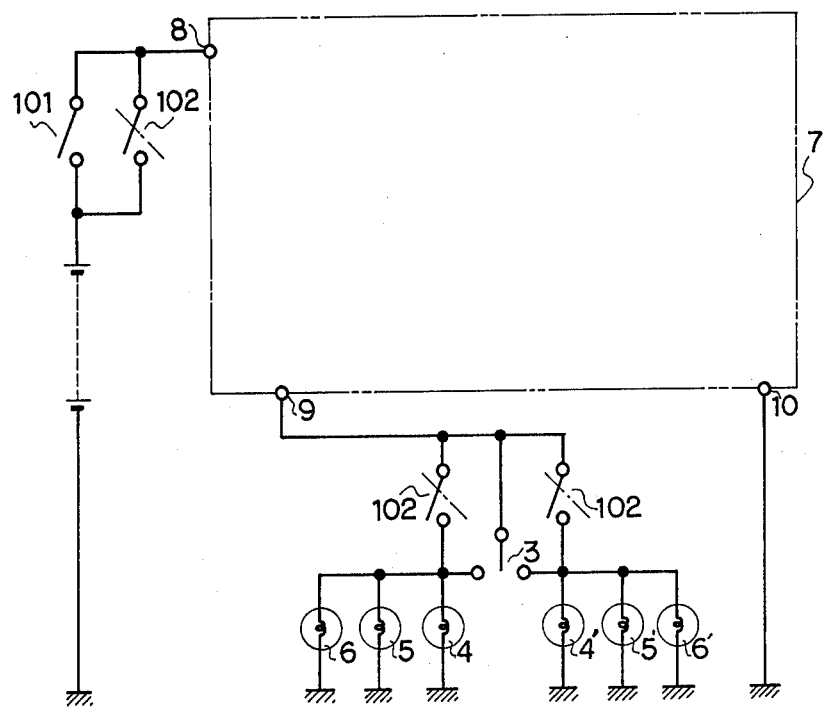

FIG. 3 illustrates a second embodiment of the flasher apparatus in which the flasher control circuit is the same as that of the first embodiment. Therefore, reference is made to FIG. 1 when necessary in the following description. Numeral 101 designates a battery switch whose one and the other terminals are connected to the power terminal of the battery 1 and to the power terminal 8. Numeral 102 designates a malfunction indicating switch (hazard switch) which is a three-circuit cooperative type. One circuit of the switch 102 is connected between the source of electric power 1 and the power terminal 8. Other two circuits are connected respectively between the load terminal 9 and the lamps 4, 5 and 6 and between the load terminal 9 and the lamps 4', 5' and 6'.

According to this embodiment, the same operation as in the first embodiment is performed when the short-circuit is present upon closures of the battery switch 101 and the direction indicating switch 3. That is, the short-circuit is detected and the contact 11 is responsively kept open. Provided that the switch 3 is returned to its open position, the circuit is reset. It should be noted that, when the battery switch 101 is opened before the switch 3 is opened, the third transistor 32 is rendered OFF with no voltage supply from the source of electric power 1. As a result, the fourth and fifth transistors 33 and 34 are sequentially rendered OFF so that the circuit is reset. Assuming that the malfunction indicating switch 102 is closed by a vehicle operator to inform the presence of short-circuit malfunction, the source of electric power 1 is connected to the power terminal 8 under the opening of the battery switch 101 and the direction indicating lamps 4, 4', 5, 5' 6 and 6' are energized through the switch 102.

On this occasion, the current which is twice as large as in the normal condition flows through the current detecting resistor 13. The circuit is designed such that the third transistor 32 is not supplied with the sufficient current by the potential difference across the resistor 13 relative to such a magnitude of the current. The short-circuit detector circuit 30 does not operate and the flashing of the lamps is repeated. When the short-circuit occurs, the short-circuit detector circuit 30 operates, that is, the transistor 32 is rendered ON, in response to the short-circuit current which is larger than the malfunction indicating load current. As to resetting the short-circuit detector circuit 30, it is not distinguishable because of the three-circuit cooperativeness of the switch 102 that which one of the switches opens first. Therefore, there occurs two kinds of resetting modes (resetting orders) in dependence on the order of opening the direction indicating switch 3 and the battery switch 101. Thus the apparatus according to the second embodiment are used not only to indicate the turn direction but also to indicate the malfunction by periodically energizing all the lamps.

Figure 4:
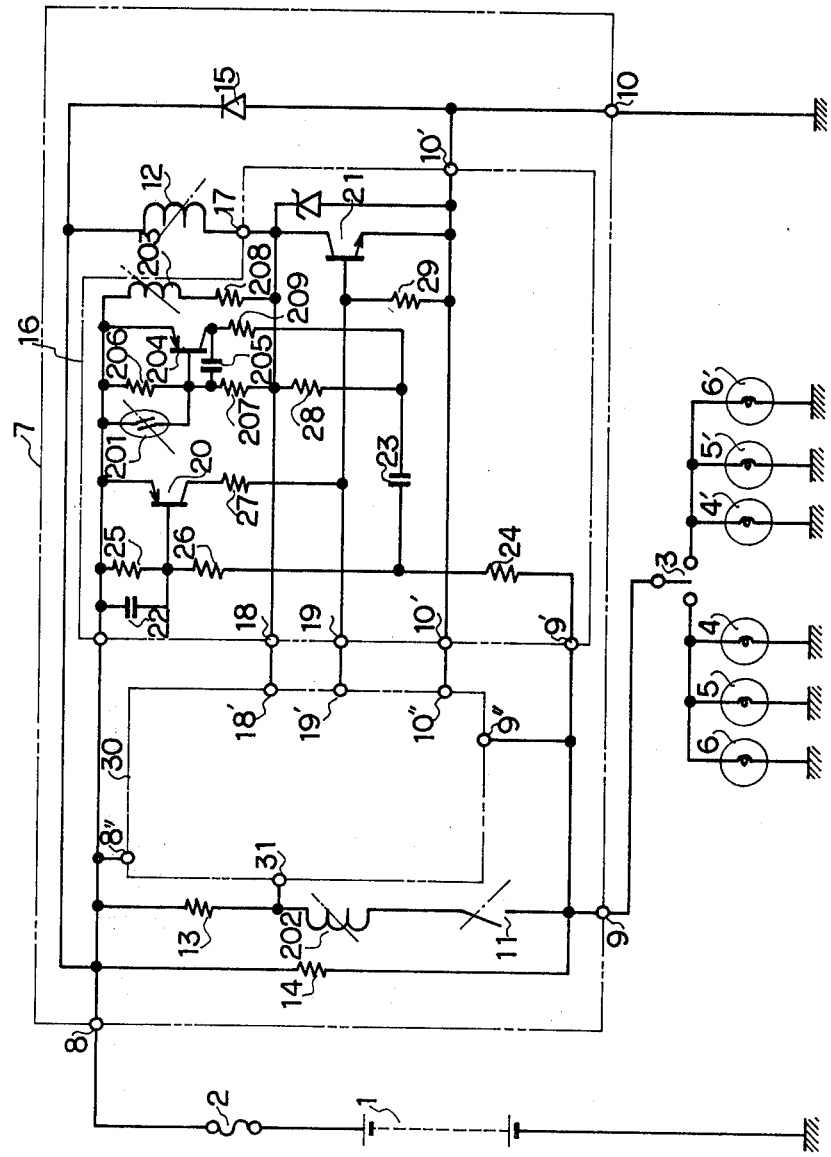

FIG. 4 illustrates a third embodiment in which a lamp outage detector circuit is incorporated. A current winding 202 and a voltage winding 203 are provided differentially and associated with a reed switch 201, thus forming a relay. Numeral 204 designates a transistor, 205 a capacitor, and 206 to 209 resistors.

In operation, when the direction indicating switch 3 is closed to the left under the absence of the lamp outage, the reed switch 201 is rendered ON to render the transistor 204 OFF during the lamp energization. This is because that the current winding 202 and a voltage winding 203 are in a differential relation. Under the presence of the outage of one lamp, on the contrary, the reed switch 201 is kept OFF to render the transistor 204 ON with the base current supplied thereto. The potential on the capacitor 23 is increased by the resistors 209 and 28 so that the capacitor 23 completes its charging earlier than the case where the lamp outage is absent. The capacitor 23 completes its discharging earlier in the same manner. As a result, the flashing frequency of the lamps is increased to indicate the outage of one of the lamps. The potential difference across the current detecting resistor 13 is decreased in proportion to the load current of one lamp and the short-circuit detector circuit 30 does not operate. Provided that the short-circuit occurs under the lamp outage, the short-circuit detection is attained in response to the potential difference across the current detecting resistor 13 in the same manner as described above. Thus the short-circuit detection is enabled even in the flasher apparatus employing the lamp outage detector circuit.

In the abovedescribed embodiments, the flasher switch means is comprised of the relay contact 11 and the relay winding 12, the current detecting means is comprised of the current detecting resistor 13, and the control means is comprised of the oscillator circuit 16 and the short-circuit detector circuit 30 including the self-holding transistor 34 and the flasher-preventing transistor 33. However, the invention is not limited to the illustrated embodiments but may be modified in various ways.

What we claim is:

1. A flasher apparatus for vehicles having an electric power source, two groups of direction indicating lamps and a direction indicating switch manually closed to select one of said two lamp groups, said flasher apparatus comprising:

relay means having a winding connected in series with said electric power source and a normally-open switch connected in series with said electric power source and said direction indicating switch, said normally-open switch being closed to energize said selected one of two lamp groups by said electric power source when said winding is energized;

oscillator means kept operative by the closure of said direction indicating switch and including a first and second transistors, said second transistor being connected in series with said winding and rendered conductive and nonconductive in response to the respective conduction and nonconduction of said first transistor to energize said winding periodically;

current detecting means reponsive to an electric current flowing from said electric power source to said selected one of two groups and effective to produce a voltage proportional to said electric current; and short-circuit detector means including third, fourth and fifth transistors, said third transistor being connected in series with said second transistor and effective to be rendered conductive when said voltage exceeds a predetermined value, said fourth transistor being connected in series with said first transistor and rendered conductive when said first transistor is rendered conductive from the nonconduction under the conduction of said third transistor to thereby prevent said second transistor from being rendered conductive thereafter, and said fifth transistor being connected in parallel with said normally-open switch and rendered conductive by the conduction of said third transistor under the nonconduction of said second transistor to thereby keep the conduction of said third transistor under the nonconduction of said second transistor.

* * * * *